United States Patent
Burbank et al.

(10) Patent No.: US 10,992,612 B2
(45) Date of Patent: Apr. 27, 2021

(54) CONTACT INFORMATION EXTRACTION AND IDENTIFICATION

(71) Applicant: salesforce.com, inc., San Francisco, CA (US)

(72) Inventors: Noah William Burbank, Palo Alto, CA (US); Gabriel Starr Krupa, Petaluma, CA (US); Bradford William Powley, Palo Alto, CA (US); Alexis Roos, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/262,508

(22) Filed: Jan. 30, 2019

(65) Prior Publication Data
US 2020/0153765 A1   May 14, 2020

Related U.S. Application Data

(60) Provisional application No. 62/759,962, filed on Nov. 12, 2018.

(51) Int. Cl.
| | |
|---|---|
| *H04L 12/58* | (2006.01) |
| *H04L 15/16* | (2006.01) |
| *G06F 15/16* | (2006.01) |
| *G06F 40/205* | (2020.01) |

(52) U.S. Cl.
CPC .......... *H04L 51/046* (2013.01); *G06F 40/205* (2020.01); *H04L 51/16* (2013.01)

(58) Field of Classification Search
CPC ...... H04L 51/046; H04L 51/16; G06F 40/205

USPC .......................................................... 709/206
See application file for complete search history.

(56) References Cited

U.S. PATENT DOCUMENTS

| | | | |
|---|---|---|---|
| 8,438,257 B2* | 5/2013 | Belinchon Vergara | H04L 69/40 709/223 |
| 8,503,629 B2* | 8/2013 | Strope | H04L 51/16 379/93.24 |
| 9,269,081 B1* | 2/2016 | Panzer | G06Q 10/107 |
| 10,204,086 B1* | 2/2019 | Johnston | G06F 40/134 |
| 10,367,771 B2* | 7/2019 | Dabney | H04L 51/28 |
| 10,412,206 B1* | 9/2019 | Liang | H04M 3/42204 |
| 2004/0163043 A1* | 8/2004 | Baudin | G06F 16/313 715/234 |
| 2006/0253418 A1* | 11/2006 | Charnock | G06F 16/34 |
| 2011/0106746 A1* | 5/2011 | Ventilla | H04L 12/66 706/50 |

(Continued)

FOREIGN PATENT DOCUMENTS

AU   2014331710 A1 *   5/2016   ......... H04L 65/1076

*Primary Examiner* — David R Lazaro
*Assistant Examiner* — Berhanu Shitayewoldetadik
(74) *Attorney, Agent, or Firm* — Holland & Hart LLP

(57) ABSTRACT

A database server may identify mentioned names in a body of a message and extract the names using name identification heuristics and algorithms. The service retrieves or utilizes a distributed connection graph to identify contacts associated with the parties to the conversation that may match or be similar to the mentioned name. Contacts may be scored based on similarities between the extracted name the names associated with nodes of the graph, as well as other factors. The highest scoring contact may be surfaced or displayed to one or more of the parties to the communication message.

20 Claims, 10 Drawing Sheets

(56) References Cited

U.S. PATENT DOCUMENTS

| | | | | |
|---|---|---|---|---|
| 2012/0102130 A1* | 4/2012 | Guyot | H04L 51/12 | 709/206 |
| 2012/0166999 A1* | 6/2012 | Thatcher | G06F 16/24578 | 715/780 |
| 2012/0203821 A1* | 8/2012 | Czajka | G06Q 10/107 | 709/203 |
| 2013/0007126 A1* | 1/2013 | Ziemann | G06Q 50/01 | 709/204 |
| 2013/0066993 A1* | 3/2013 | Granito | H04L 51/04 | 709/206 |
| 2014/0006970 A1* | 1/2014 | Casey | H04L 51/32 | 715/753 |
| 2014/0143347 A1* | 5/2014 | Murarka | H04L 51/32 | 709/206 |
| 2015/0127943 A1* | 5/2015 | Luo | H04L 63/0428 | 713/168 |
| 2015/0161519 A1* | 6/2015 | Zhong | G06F 40/295 | 706/12 |
| 2015/0220995 A1* | 8/2015 | Guyot | G06Q 50/01 | 705/14.66 |
| 2015/0310100 A1* | 10/2015 | Bursey | G06F 16/951 | 707/706 |
| 2016/0042069 A1* | 2/2016 | Lee-Goldman | G06F 40/295 | 707/706 |
| 2016/0099903 A1* | 4/2016 | Dabney | H04W 4/14 | 709/206 |
| 2017/0041388 A1* | 2/2017 | Tal | G06Q 10/10 | |
| 2017/0060851 A1* | 3/2017 | Lai | G06F 21/34 | |
| 2017/0063825 A1* | 3/2017 | Jeong | H04L 63/08 | |
| 2017/0142056 A1* | 5/2017 | Ganin | H04L 51/16 | |
| 2017/0187654 A1* | 6/2017 | Lee | G06F 40/279 | |
| 2017/0193010 A1* | 7/2017 | Lappas | G06N 7/005 | |
| 2017/0200128 A1* | 7/2017 | Kumahara | G06Q 50/01 | |
| 2017/0235726 A1* | 8/2017 | Wang | G06F 16/9535 | 707/730 |
| 2017/0235836 A1* | 8/2017 | Wang | G06Q 50/01 | 707/730 |
| 2018/0046957 A1* | 2/2018 | Yaari | G06Q 10/1095 | |
| 2018/0082678 A1* | 3/2018 | Olmstead | G10L 15/22 | |
| 2018/0159833 A1* | 6/2018 | Zhang | H04L 29/06 | |
| 2018/0198670 A1* | 7/2018 | Salmela | H04L 9/321 | |
| 2018/0262493 A1* | 9/2018 | Andrade | G06F 21/30 | |
| 2018/0336794 A1* | 11/2018 | Chen | G06F 3/0481 | |
| 2019/0171338 A1* | 6/2019 | Voss | H04L 51/04 | |

* cited by examiner

CONTACT INFORMATION EXTRACTION AND IDENTIFICATION

CROSS REFERENCE

The present application for patent claims priority to U.S. Provisional Patent Application No. 62/759,962 by Burbank et al., entitled "Contact Information Extraction and Identification," filed Nov. 12, 2018, which is assigned to the assignee hereof and expressly incorporated by reference herein.

FIELD OF TECHNOLOGY

The present disclosure relates generally to database systems and data processing, and more specifically to contact information extraction and identification.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

One or more users of the cloud platform may transmit or receive communication messages that mention a person that is not a party to the communication message. Systems may not have the ability to automatically detect a mentioned name and retrieve contact information associated with the mentioned name. This limitation is due to current systems not having robust contact libraries and/or current systems not having a reliable way of determining the identity of the mentioned person (e.g., how to distinguish between two Johns in the contact library).

DETAILED DESCRIPTION

Figure 1:
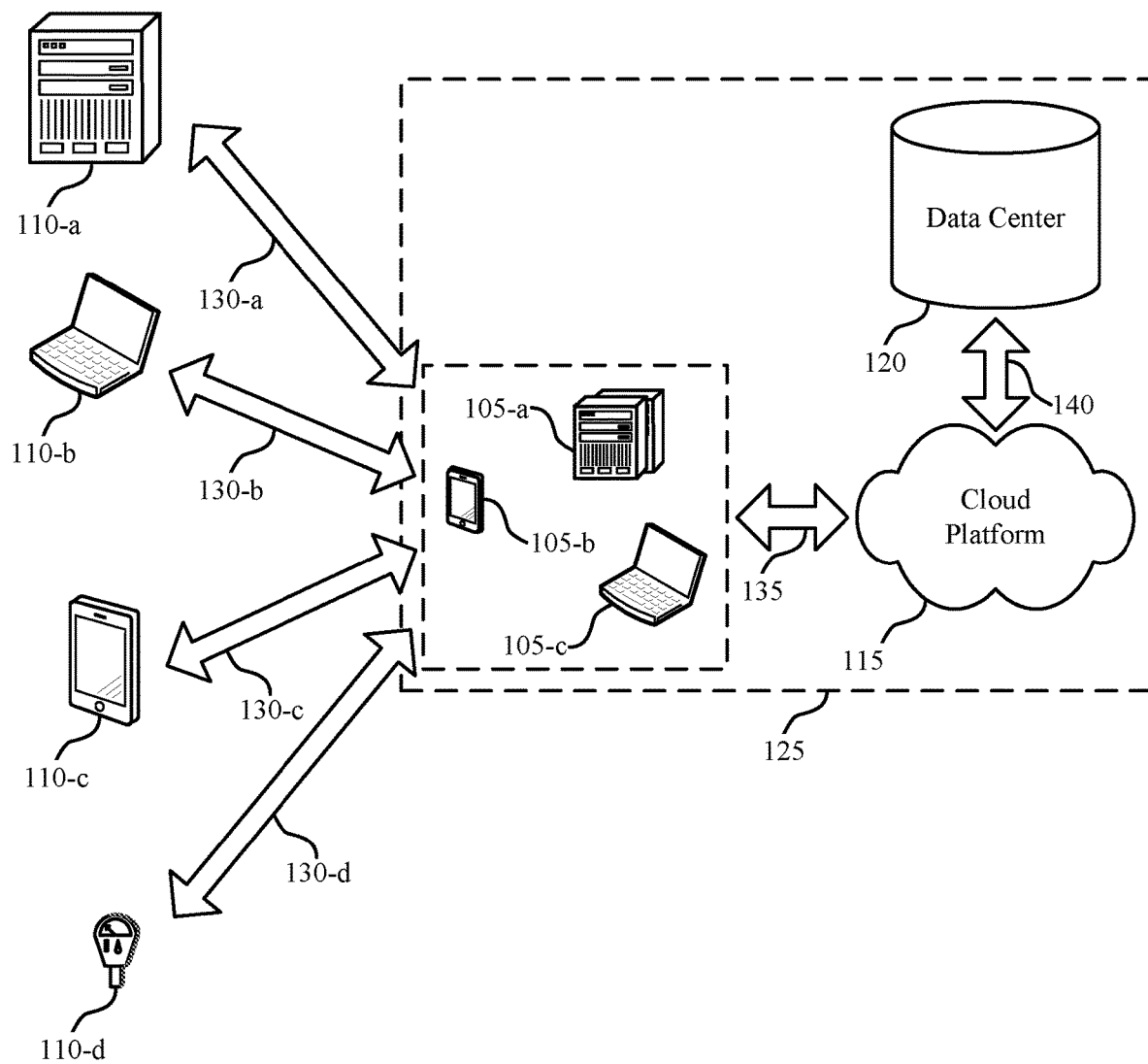
FIG. 1 illustrates an example of a system for data processing that supports contact information extraction and identification in accordance with aspects of the present disclosure.

Digital communication messages, such as emails, may mention the name of a person that is not a party to the message or email thread. A contact extraction and identification service may automatically detect and extract a mentioned name, identify contact information associated with the name, and display or otherwise surface the contact information to one or more of the parties to the communication message. The service may utilize a robust connection or activity graph that is based on various interactions between users. The interactions may include communication messages such as emails, calendar events, service tickets, text messages, voice calls, social media messages, documents, activities, or any combination of these. The contact extraction and identification service, or an associated service, may perform natural language processing (NLP) analysis on the communication messages to extract metadata or other information, such as timestamps, associated users, or styles of communication. The extracted metadata maybe used to generate a graph (e.g., using batches of communication messages stored in memory) or update an existing graph (e.g., using realtime or pseudo-realtime communication messages streams). The graph may represent the relationships within an organization, as well as relationships with targets external to the organization. For example, the nodes of the graph may represent various contacts (internal and external), and the edges of the graph may represent communications and other interactions, along with corresponding connection strength values, between the users and targets.

As communication messages are shared between users, the contact extraction and identification service may identify mentioned names in a body of a message and extract the names using name identification heuristics and algorithms. The service may determine if the mentioned name corresponds to one of the parties of the message before further processing is performed. Accordingly, the service may avoid processing extracted names when the name matches a party to the message (e.g., sender, recipient, or copied party), because one may assume that a party to the message may have the contact information or that such information is easily obtainable. If the name does not match a party the message, the service retrieves or utilizes the distributed connection graph to identify contacts associated with the parties to the conversation that may match or be similar to the mentioned name. Contacts may be scored based on similarities between the extracted name and the names associated with nodes of the graph, as well as other factors. The highest scoring contact may be surfaced or displayed to one or more of the parties to the communication message.

In some cases, the service retrieves subsets of the distributed connection graph associated with the parties to the communication. For example, a sender sends an email that mentions a name to a recipient, and the service retrieves a subset of the distributed connection graph associated with the sender and the recipient. The subsets may include the sender and associated "close" connections and the recipient and associated "close" connections. Close connections may be identified based on weighted communication and interaction metrics parameterized into edges of the graph. Accordingly, the service may avoid processing the entire graph for determining a mentioned contact. In some cases, the close connections are identified and maintained by a graphing service. In alternative cases, the close connections are identified in realtime or pseudo-realtime. In some cases, the service utilizes contextual information associated with the message to determine the mentioned contact. For example, if the message mentions a project name, then contacts associated with the project name may be provided greater weight in determining the mentioned contact.

The service may further score one or more of the close connections based on name matching techniques and may weight certain users based on various factors. For example, the service may provide greater weight to contacts associated with the sender of an email, because one may assume that the sender "knows" the name that is mentioned. For identified contacts that match the mentioned name, the service may further filter, sort, or make display decisions based on information associated with identified contacts. For example, the system may filter names based on useful distinctions. In one example, the service identifies whether a contact having an "executive" title within an organization is mentioned. Thus, the service may display the identified contact when a name corresponds to an executive in an organization. In another example, the service may determine whether to surface contact information based on data associated with the contact. Such data may include purchase history, time since last interaction, role information, whether the contact is sufficiently connected within an organization, etc. As such, the service may maintain or access data associated with contacts to make display determinations, filtering decisions, and sorting decisions.

Aspects of the disclosure are initially described in the context of an environment supporting an on-demand database server. Aspects of the disclosure are further described with reference to system and process flow diagrams. Aspects of the disclosure are further illustrated by and described with reference to apparatus diagrams, system diagrams, and flowcharts that relate to contact information extraction and identification.

FIG. 1 illustrates an example of a system 100 for cloud computing that supports contact information extraction and identification in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may offer a contact extraction and identification service that processes various communication messages, including messages transmitted between cloud client 105 and/or contacts 110 and activities associated with cloud clients 105 and/or contacts 110, and may perform NLP, metadata extraction, or both on the communication messages. The NLP and metadata extraction may identify activity data to be used for activity-based graph generation and upkeep. The contact extraction and identification service (or an associated service) may generate a graph, where the nodes of the graph represent users and targets (e.g., corresponding to cloud clients 105, contacts 110, or both) and the edges of the graph represent connections—and corresponding connection strengths—between the users and targets.

The contact extraction and identification service may utilize this graph to identify mentioned names within communication messages, such as emails. Communication messages transmitted between two users (e.g., a cloud client 105 and/or a contact 110) may mention a name. The contact extraction and identification service may extract the name and utilize the graph to identify one or more contacts that may correspond to the mentioned and extracted name. The identified one or more contacts may be indicated to the user, such that the user may be able to efficiently follow up or respond to the communication.

Some systems may able to provide contact information for parties to a communication, such as the sender, recipient, or parties that are copied in a messages. However, systems may not be able to identify or provide contact information for persons that are mentioned in the body or text of a communication message. This limitation may be due to current systems not having robust contact libraries, not having the ability to efficiently use such libraries, or not having a reliable way of determining an identity of a mentioned person (e.g., how to distinguish between two similar names in a library). Furthermore, a system may utilize a connection graph to identify contacts. However, large connection graph corresponding to many communications and many users may include thousands of connections. Conducting processing on such a connection graph may incur significant processing and memory overhead in a graphing system and may not result in accurate contact identifications (e.g., many false positives). In addition, a graphing system may expose an endpoint for receiving contact identification requests. When many communications occur in a short time period, the endpoint may receive an excessive amount of requests, which may increase latency and result in processing delays.

In contrast, the cloud platform 115 provides a process for extracting names and efficiently and accurately identifying a contact corresponding to the name. A contact extraction and identification service may analyze a communication message to extract names using name identifying heuristics and algorithms. The service may determine whether the extracted name corresponds to one of the parties to the communication message, such as a sender, recipient, or a copied party. If the service determines that the name likely does not correspond to a party to the communication message, then the service analyzes localized portions of the distributed connection graph, where the portions are localized around nodes corresponding to the parties to the communication message. The localization may be based on closely connected contacts (e.g., nodes) corresponding to the parties to the communication. In other words, a subset of the graph corresponding to each party may be analyzed to identify a likely mentioned contact. The subsets may be identified or analyzed in real time, or may be identified as a part of a prior processing step. In some cases, the distributed graph is continuously (e.g., in realtime or pseudo-realtime) as a server analyzes interactions between various users. This process may include documenting or maintain closely connected contacts to various nodes.

As the localized portions of the graph are analyzed, the service may identify contacts connected to the parties to the communication that have names or identifiers similar to the name extracted from the communication message. The service may use varying techniques such as pattern matching, string matching, distance calculation, etc. to compare the extracted names to the identifiers. The service further calculates a contact ranking metric based on various factors such as whether the contact is associated with the sender or recipient or third party, whether the contact is relatively closely connected to the party (e.g., weight of connection), etc. Different factors may be provided different weights. In some cases, the service considers contextual information associated with the communication message, such as other text within the body, a timestamp associated with the communication, etc. The service may identify one or more of the contacts based on the calculated contact ranking metrics as possible mentioned contacts. The service may transmit an indication on a display, to one of the users, one or more of the identified contacts and may display a probability of the contact. Thus, the distributed connection graph allows the service to provide accurate contact identification. Further, because the service may break the graph into subsets relevant to the communication message (e.g., the subsets are associated with parties to the communication message), the service may efficiently process the subsets to identify probable contacts rather than process an entire connection graph to identify contacts, which may not be relevant to the parties to the communication.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, utilization of the system 100, users associated with a cloud clients 105 are transmitting multiple emails regarding a project that involves a contact 110. One of the users transmits an email mentioning a name of a user associated with the contact 110. The contact extraction and identification service of the cloud platform 115 analyzes the email and extracts the mentioned name. The service determines whether the mentioned name matches one of the users that are parties to the email and fetches the closest connections associated with the parties from the graph. The service identifies matching contacts, scores the contacts based on various factors, and transmits an indication one or more of the scored contacts to one or more of the parties such that the parties are able to identify the mentioned contact without performing any manual searching.

Figure 2:
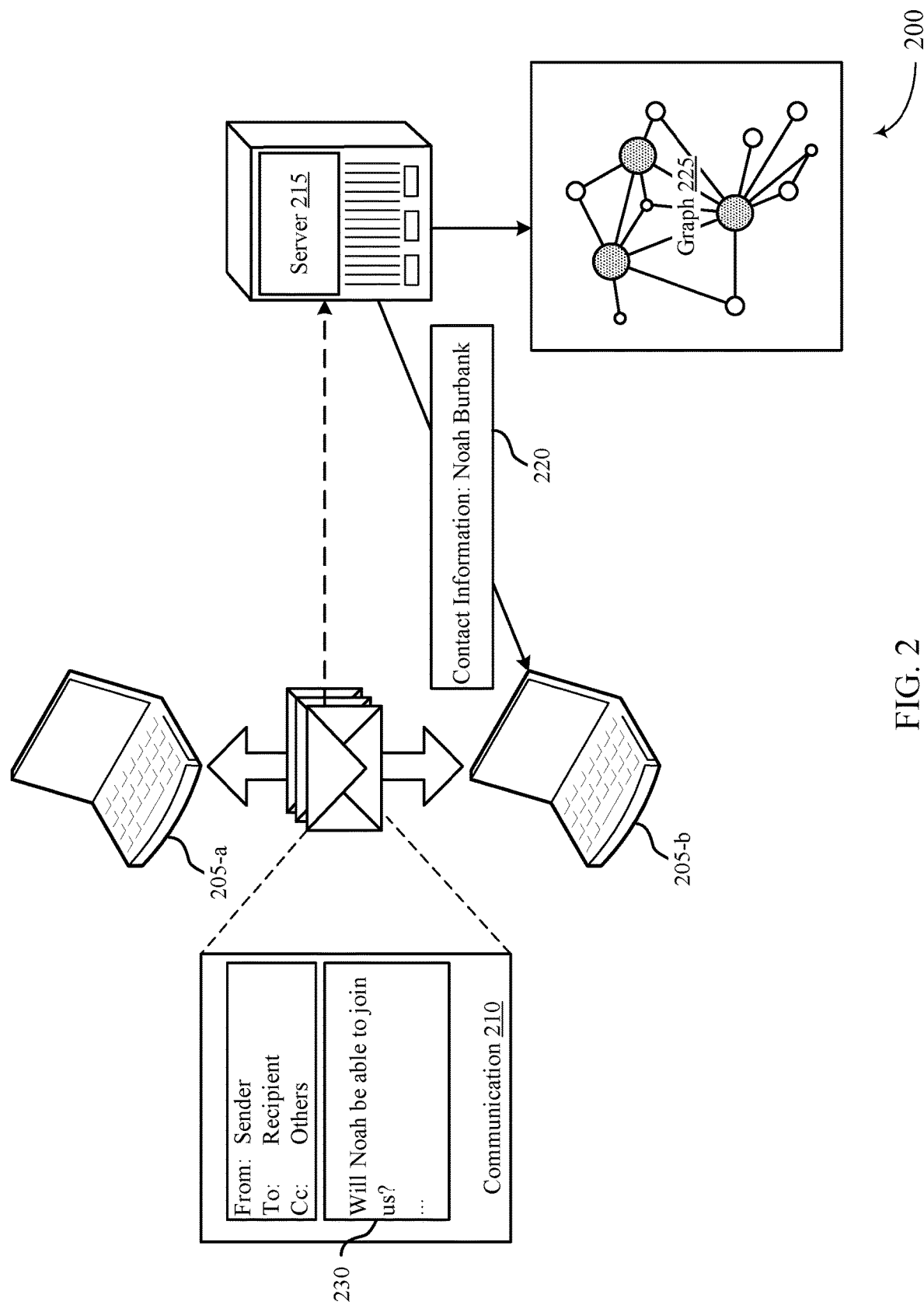
FIG. 2 illustrates an example of a system that supports contact information extraction and identification in accordance with aspects of the present disclosure.

FIG. 2 illustrates an example of a system 200 that supports contact information extraction and identification in accordance with aspects of the present disclosure. The system 200 includes devices 205, which may be examples of cloud clients 105 or contacts 110 of FIG. 1, and a server 215, which may be example of various components of the subsystem 125 of FIG. 1. The server 215 builds, maintains, augments, and utilizes a graph 225 representing connections between various users. Each node of the graph 225 represents a user identifier associated with a user, and edges between the nodes represent connections between the user that are based on internal and external interactions (e.g., the interactions 210). The edges may be weighted based on various interaction factors such as interaction type, interaction recency, interaction frequency, etc.

The devices 205 transmit various communication messages between the devices 205 and other devices. One of the communications, illustrated as communication 210, is transmitted between the device 205-*a* and the device 205-*b*. The communication 210 includes a body 230, which includes the text: "Will Noah be able to join us?" The server 215 may analyze the message to augment the graph and to determine whether a name is mentioned in the body 230. Using various name identification heuristics and algorithms, the server 215 may identify the term "Noah" as a name. The server 215 may then determine whether Noah corresponds to the sender, recipient, or others, which are parties to the communication 210. The server 215 matches Noah against the parties to the communication 210, because the service assumes that the parties have each other's contact information or that the contact information is easily obtainable. If Noah does not correspond to a party the communication 210, then the server 215 retrieves sets of user identifiers corresponding to the parties to the communication message from the graph 225. The server 215 may generate one or more objects that include user identifiers and corresponding interaction data based on the graph 225. The retrieved user identifiers may be a set of user identifiers that correspond to each party's closest connections, which may be determined based on the interaction data parameterized in the graph 225.

Using the sets of user identifiers and interaction data corresponding to the parties to the communication 210, the server 215 identifies whether names corresponding to the user identifiers or other identifying information match "Noah." The server 215 may identify contact ranking metrics based on certain factors such as, whether contacts are associated with the sender (more likely than being associated with a recipient), how close the connection is to the party, contextual information included in the communication 210, and other factors. The server 215 may identify a set of user identifiers that satisfy a connection metric threshold. Further, the server 215 may determine whether the identified user identifiers match the parties to the communication 210 (e.g., a second pass). If one or more of the user identifiers do not match the parties to the communication, then the server may transmit an indication of one or more of the set of user identifiers to a user.

In FIG. 2, the server 215 extracts "Noah" from the communication 210, determines that Noah does not correspond to one of the parties to the communication, identifies a set of user identifiers from the graph 225, and identifies the contact information 220 as corresponding to the mentioned name. The contact information 220 is transmitted to the user device 205-*b*.

Figure 3:
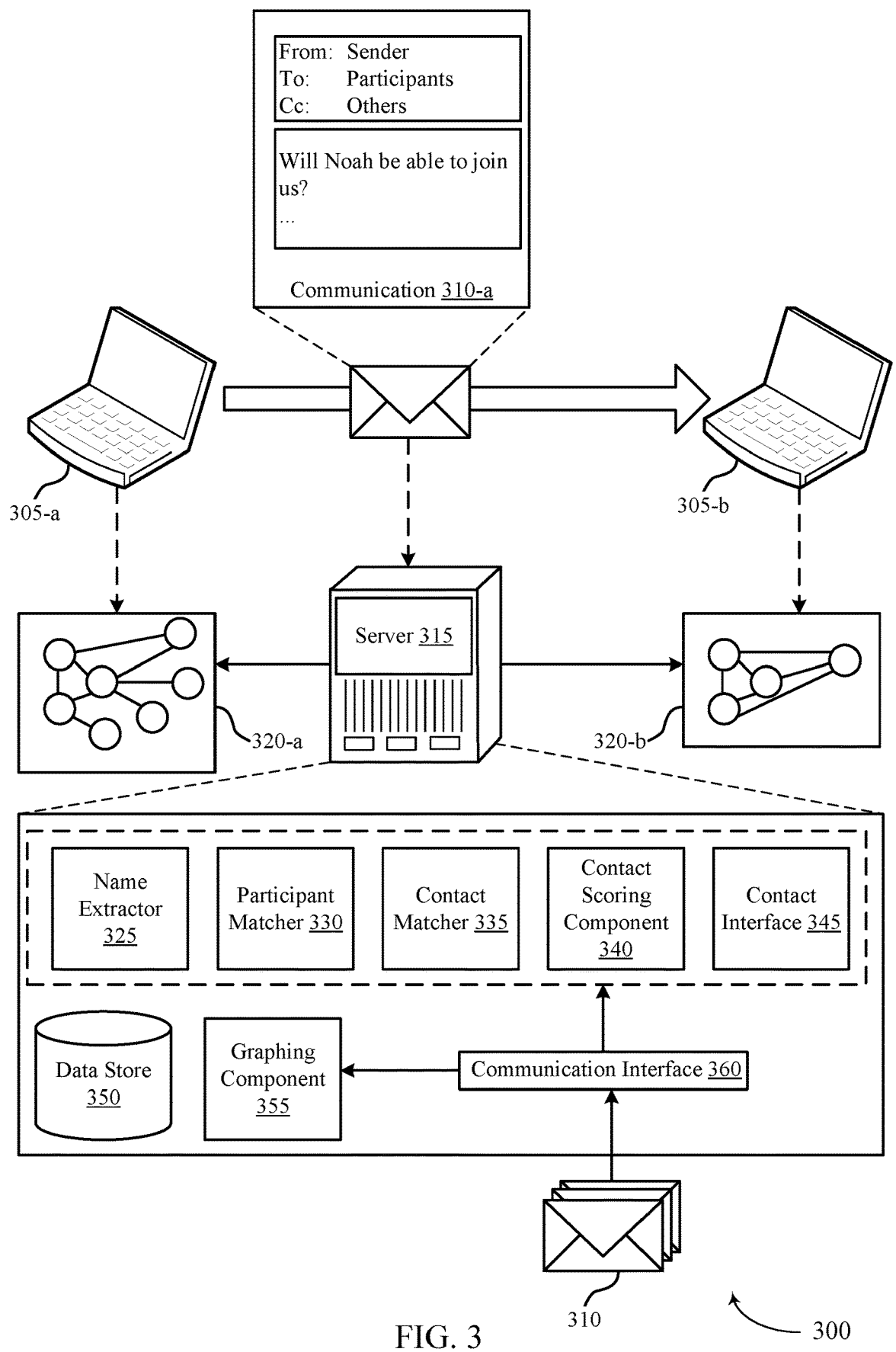
FIG. 3 illustrates an example of a system that supports contact information extraction and identification in accordance with aspects of the present disclosure.

FIG. 3 illustrates an example of a system 300 that supports contact information extraction and identification in accordance with aspects of the present disclosure. The system 300 includes devices 305, which may be examples of the cloud clients 105 or contacts 110 of FIG. 1 or the devices 205 of FIG. 2, and a server 315, which may be example of various components of the subsystem 125 of FIG. 1 or the server 215 of FIG. 2. The server 315 receives various communication messages and interactions 310 at a communication interface 360 and builds, maintains, augments, and utilizes a graph representing connections between various users based on the communication messages and interactions 310. The graph, as well as communications, weights, and other data may be stored in a datastore 350.

In FIG. 3, a user of device 305-*a* transmits a communication 310-*a* to the device 305-*b*. In the illustrated implementation, the communication 310-*a* is an email. The server 315, which may implement various processes and systems for transmitting or supporting communications, receives the communication 310-*a* at the communication interface 360. A graphing component 355 of the server 315 may perform natural language processing (NLP) analysis on the communication message 310-*a* to extract metadata or other information, such as timestamps, associated users, or styles of communication. The graphing component 355 may be a part of the contact extraction and identification service or part of an associated service. The extracted metadata maybe used to update an existing graph (e.g., using realtime or pseudo-realtime communication messages streams). The graph may represent the relationships within an organization, as well as relationships with targets external to the organization. In some cases, the graphing component 355 may expose an endpoint for receiving requests for various communication and graph data. In some cases, the graphing component 355 maintains a set of "closest connections" corresponding to users of the graph. For example, each user in the graph may include a set of closest connected users, which are based on communication and interaction data.

A name extractor 325 of the server 315 may further perform NLP and name identification analysis to determine whether the body of the communication 310-*a* includes a mention of a name. If the name extractor 325 identifies a name (e.g., "Noah"), then a participant matcher 330 determines whether the name matches a participant (e.g., sender, recipient, or others) to the communication 310-*a*. If the name corresponds to a participant, then the name extraction and identification process may terminate. If the name does not correspond or match with a participant, then a contact matcher 335 retrieves sets of user identifiers 320 corresponding to participants of the communication 310-*a* from the graph, which may be stored in the datastore 350. The sets of user identifier 320 are illustrated as being subsets of the graph, but it should be understood that the server 315 may retrieve the sets as one or more objects, lists, etc. The sets of user identifiers 320 include information that identifies connections between the user identifiers. In the graph, such information is parameterized in the edges of the graph. In FIG. 3, the set of user identifiers 320-*a* corresponds to the sender device 305-*a*, and the set of user identifiers 320-*b* corresponds to the recipient device 305-*b*. The contact matcher 335 may compare the extracted name to names associated with the sets of user identifiers 320 using textual comparison and matching techniques to identify a set of potential user identifiers that correspond to the mentioned name.

In some cases, the participant matcher 330 and the contact matcher 335 performs name matching and identification heuristics (including natural language processing) to determine whether the identified name corresponds to the participants and/or any of the received connected contacts and to determine correlation metrics between the identified names and the received contacts. The process may include matching first names, last names, nicknames, full names, determining degrees of match, etc. In some cases, the participant matcher 330 and the contact matcher 335 may access, augment, and maintain a data store including known nicknames (e.g., corresponding to known contacts and nicknames known in the general population). For example, the name "Bobby" may be identified as being mentioned in the email. Based on the name data store, the, contact matcher 335 may identify contacts with the name Robert and/or Bob as being a match. Similarly, initials may be used to match contacts. For example, if the message includes an 2 or 3 letter abbreviation, then the abbreviation may be identified as a name (based on context), and used to determine matches. The participant matcher 330 and contact matcher 335 may also identify near spellings of contacts (e.g., "Sara" is "Sarah"). The matching components may further identify names that may be misspelled, and score names (e.g., identify a correlation metric) based on the "closeness" of the spelling. Furthermore, the participant matcher 330 and the contact matcher 335 may update the data store based on user feedback or input. If a name is mentioned and a contact suggested based on the name, then a participant (e.g., a user) may send feedback, which may include an indication of a nickname or an indication of the correct contact. The database may be updated based on the feedback.

The contact matcher 335 may further consider matches based on user preferences, which may be stored in a preferences data store. The user preferences may be adjustable by a user such that the user may select full name matches, first or last name matches, nickname matches, etc. Accordingly, if the user is in an industry that only uses last names, then the user may prefer that the service only consider last name matches. Another user may want to consider all types of matches, including nicknames. Accordingly, the contact matcher 335 may consider closely spelled names, nicknames, first names, last names, etc. The users may adjust the preferences using a user interface. In some cases, the contact interface 345 may determine whether to transmit an identified matching contact based on the user preferences. For example, the contact matcher 335 may consider all or a subset of potential matches, and the contact interface (or another sub component) may determine whether to transmit the matching contacts based on the user preferences.

In some cases, the sets of user identifiers 320 are consider the closest connected users associated with the participants 305. The graphing component 355 may maintain sets of user identifiers which are closely connected to one or more particular user identifiers. The closest connected user identifiers may be continuously or periodically updated based on communications, recency of communications, etc. Accordingly, when a name is identified by the name extractor 325, the server may request, from the graphing component 355 (which may be a component of the server 315 or a component of another computing system), the closest connections corresponding to the participants 305 (e.g., the sets of user identifiers 320-a) may be included in a response.

A contact scoring component 340 may score each of the identified user identifiers from the sets of user identifiers 320 using various factors such as contact association, how connected the contact is to the party, contextual information, name matching, etc. For example, the contact scoring component 340 may provide greater weight to the set of user identifiers 320-a associated with the sending device 305-a, because one may assume that the user that drafted the text that mentions the name ("Noah") knows or is connected with the contact associated with the name. The contact scoring component 340-a may provide greater weight to contacts that are closely connected (relative to other connections) to the parties to the communication 310-a. The participant matcher 330 may identify whether one or more of the scored user identifiers match the participants to the communication 310-a. If the user identifiers do not match the participants, a contact interface 345 of the server 315 may transmit an indication of one or more of the set of additional user identifiers to a computing device 305 associated with the communication 310-a.

In some cases, the contact scoring component 340 may also filter or sort on the identified matching contacts. For example, the contact scoring component 340 may identify whether an executive of an organization corresponds to the mentioned name. If the name corresponds to an executive, then the contact interface 345 may transmit an indication of the user identifier and may also indicate that the identifier corresponds to an executive. Other distinctions may be considered based on the context. For example, contacts corresponding to certain projects within an organization may be flagged or identified. Furthermore, the contact scoring component 340 may filter identifiers that do not meet a threshold score and may sort the contacts based on the score.

In some implementations, the contact scoring component 340 may retrieve and consider additional information associated with identified contacts. For example, the contact scoring component 340 may retrieve data such as role information, purchase history, time since last discussion, a degree of connectedness, etc. The contact scoring component 340 may provide additional weight to contacts having recent communications. Furthermore, if a mentioned contact has a high degree of connectedness (e.g., based on the distributed communication graph), then higher weight may be provided to the scoring. In some cases, the contact interface 345 may determine whether to surface the contact based on such information (e.g., if the contact has a robust purchase history, whether the contact is associated with a title such as executive, etc.).

Figure 4:
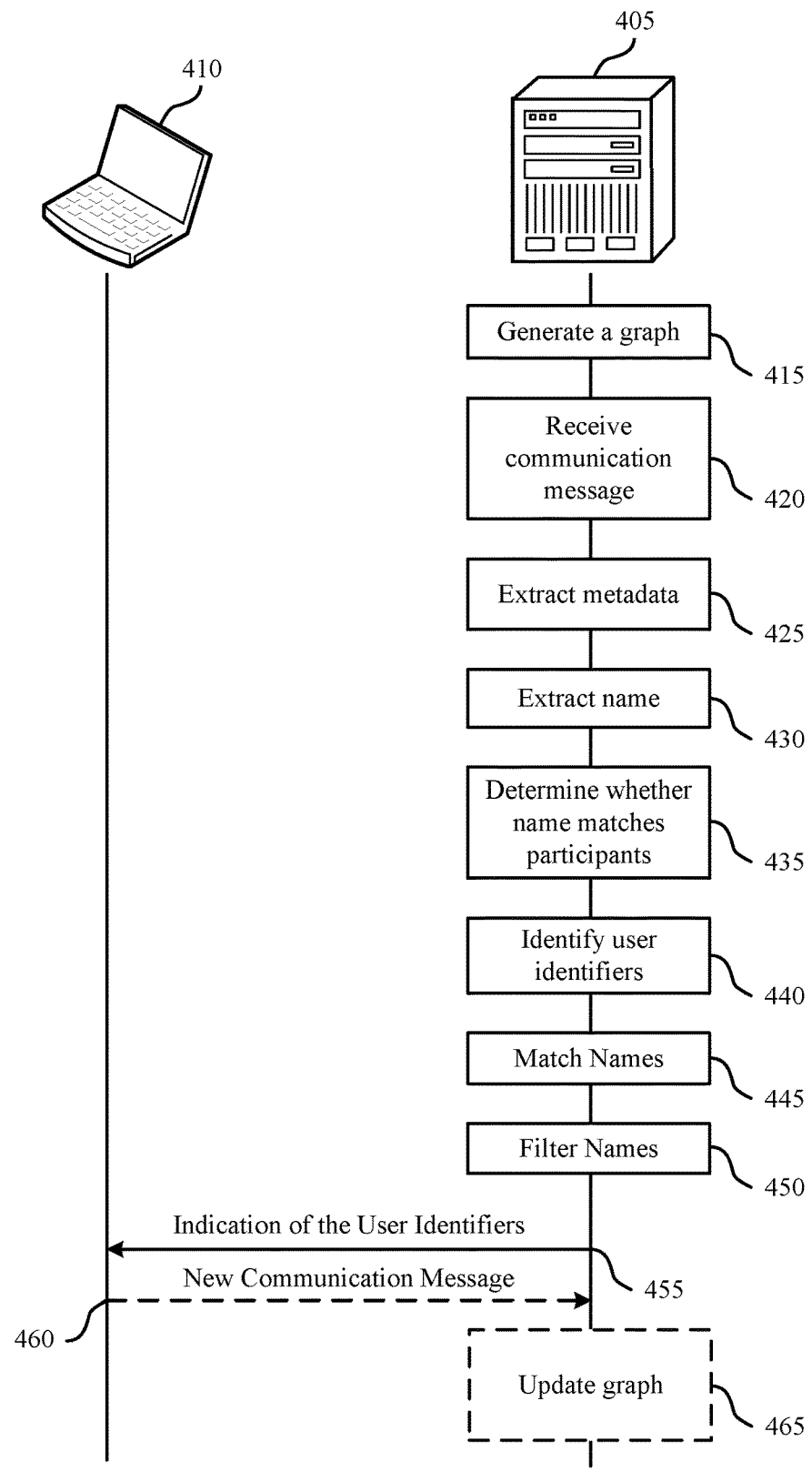
FIG. 4 illustrates an example of a process flow that supports contact information extraction and identification in accordance with aspects of the present disclosure.

FIG. 4 illustrates an example of a process flow 400 that supports contact information extraction and identification in accordance with aspects of the present disclosure. The process flow 400 may include a database server 405 and, in some cases, a user device 410. The database server 405 may be an example of a server 215 and 315 as described with reference to FIGS. 2 and 3, or may be a component of a cloud platform 115 or data center 120 as described with respect to FIG. 1. The user device 410 may be an example of a cloud client 105 or a device 205 or 305 as described herein, for example, with reference to FIGS. 1-3. The database server 405 may process communication data to determine one or more closeness scores for sets of users or corresponding user identifiers and update a connection graph based on the communication data.

At 415, the database server 405 may generate a graph representation of one or more connections between various users. In the graph representation, these connections may be represented by direct or indirect edges between users (e.g., where the users are represented by nodes). In some cases (e.g., in a multi-tenant database system), the database server 405 may store multiple tenant-specific graphs in memory. These tenant-specific graphs may or may not share connection information according to tenant information sharing policies. The graph representation may indicate an edge direction between users, a timestamp associated with messages, a sender or sender information associated with messages, a recipient or recipient information associated with messages, event types associated with messages, text associated with messages, or some combination of these or other indications.

Generating the graph may involve multiple techniques, including entity resolution, graph enhancement, or any combination of these or other graph generation techniques. Entity resolution may involve the database server 405 identifying any nodes that correspond to a same contact (e.g., if a user or target has multiple different email addresses), and merging these nodes to form a single node corresponding to the contact. Graph enhancement may involve the database server 405 performing one or more additional operations. These additional operations may include inferring whether a contact is within or outside of a user organization, identifying emails to avoid creating nodes for (e.g., based on a non-human email address, a suspicious name or email address, a shared email account, etc.), condensing user to user edge communication to reduce the size of the graph, or any combination of these or similar graph enhancement operations.

At 420, the database server may receive a communication message associated with at least a first user identifier and a second user identifier. These communication message may be an example of an email, a calendar event, a service ticket, a text message, a voice call, a social media message, a document, or any other message associated with two or more users. A user device, such as the user device 410, may send the communication message to the database server 405. For example, the user device 410 may correspond to a first user or first user identifier, and may transmit the communications to a second user or user identifier. The second user may be associated with the database server 405, and the database server 405 may receive the communication messages in addition to the second user based on the association. Alternatively, the first user may be associated with the database server 405, and may receive communications from a user device of the second user. The user device 410 of the first user may forward these communications to the database server 405 at 415. In other cases, the database server 405 may receive batches of communication messages from storage (e.g., stored in memory in a database or on a disk).

At 425, the database server 405 may extract metadata from the communication message. For example, the database server 405 may perform NLP analysis on the text of the communication messages. For each communication message, the extracted metadata may include a timestamp associated with the message, user identifiers (e.g., the first user identifier, the second user identifier, or additional user identifiers) associated with the message, or businesses or organizations mentioned in the message. Additionally or alternatively, the database server 405 may use the NLP to determine an intent of the message, a formality level of the message, an influence level of one or more users associated with the message, or any other metrics or patterns for the message that may help define the relationship between the first user identifier and the second user identifier. The NLP procedure may include data parsing, validation, filtering, extraction, normalization, anonymization, sampling, labeling, word inventing, or any combination of these or other NLP techniques.

At 430, the database server 405 may extract one or more mentioned names or persons from the body of the communication message. For example, the database server 405 may perform the NLP analysis techniques as described herein and may perform name identification heuristics and algorithms.

At 435, the database server 405 may determine whether the extracted name corresponds to participants to the communication message, such as the first user identifier and the second user identifier. In some cases, the database server 405 determines whether extracted name corresponds to user identifiers that may be otherwise associated with the message (e.g., copied in an email). The database server 405 may perform textual or pattern matching techniques to determine whether the extracted name corresponds to one of the participants or parties to the communication message. If the extracted name corresponds to one of the participants to the communication message, then the process flow 400 may terminate.

At 440, if the extracted name does not correspond to one of the participants to the messages, then the database server 405 may identify a set of additional user identifiers based on a graph representation of connections between the first user identifier and first set of user identifiers and a graph representation of connections between the second user identifier and a second set of user identifiers. The database server 405 may import or extract the set of user identifiers from the graph representation of connections based on contacts that are considered close connections to the first user identifier and the second user identifier. The closest connection may be maintained by the server and may be based on communication data between various user identifiers. The set of additional user identifiers may be identified using pattern matching, text comparison (e.g., comparing the extracted name to names associated with the user identifier), and other techniques.

At 445, the database server 405, may match the extracted name to at least one name corresponding to each user identifier of the set of additional user identifiers. Matching the name may include comparing the texts of the names, identifying potential nicknames, comparing the extracted names to first names, last names, nicknames, initials, etc. In some cases, the matching is based on user preferences associated with the participants to the communication message. In some cases, the database server may calculate a correlation metric for each of the additional user identifiers based on comparisons between the extracted name and the additional user identifiers. The calculation may consider and weight various factors such as strength of connection, whether the user identifier is associated with the sender, etc.

At 450, the database server 405 may filter the matched names based on information associated with the contacts. Such information may include titles (e.g., executive), purchase history, time period since last communication, role information, a degree of connectedness, or a combination thereof.

At 455, the database server 445 may transmit an indication of one or more of the set of additional user identifiers. Contact information corresponding to the user identifiers may be transmitted and displayed or surfaced to one or more of the users or parties to the communication message.

At 460, the database server 405 may receive a new communication message associated with the first and second user identifiers. The new communication message may be part of a realtime or pseudo-realtime communication stream. At 465, the database server 405 may extract metadata from the new communication message, analyze the new metadata, update the graph based on the new information, and perform the name extraction and contact identification processes described herein.

Figure 5:
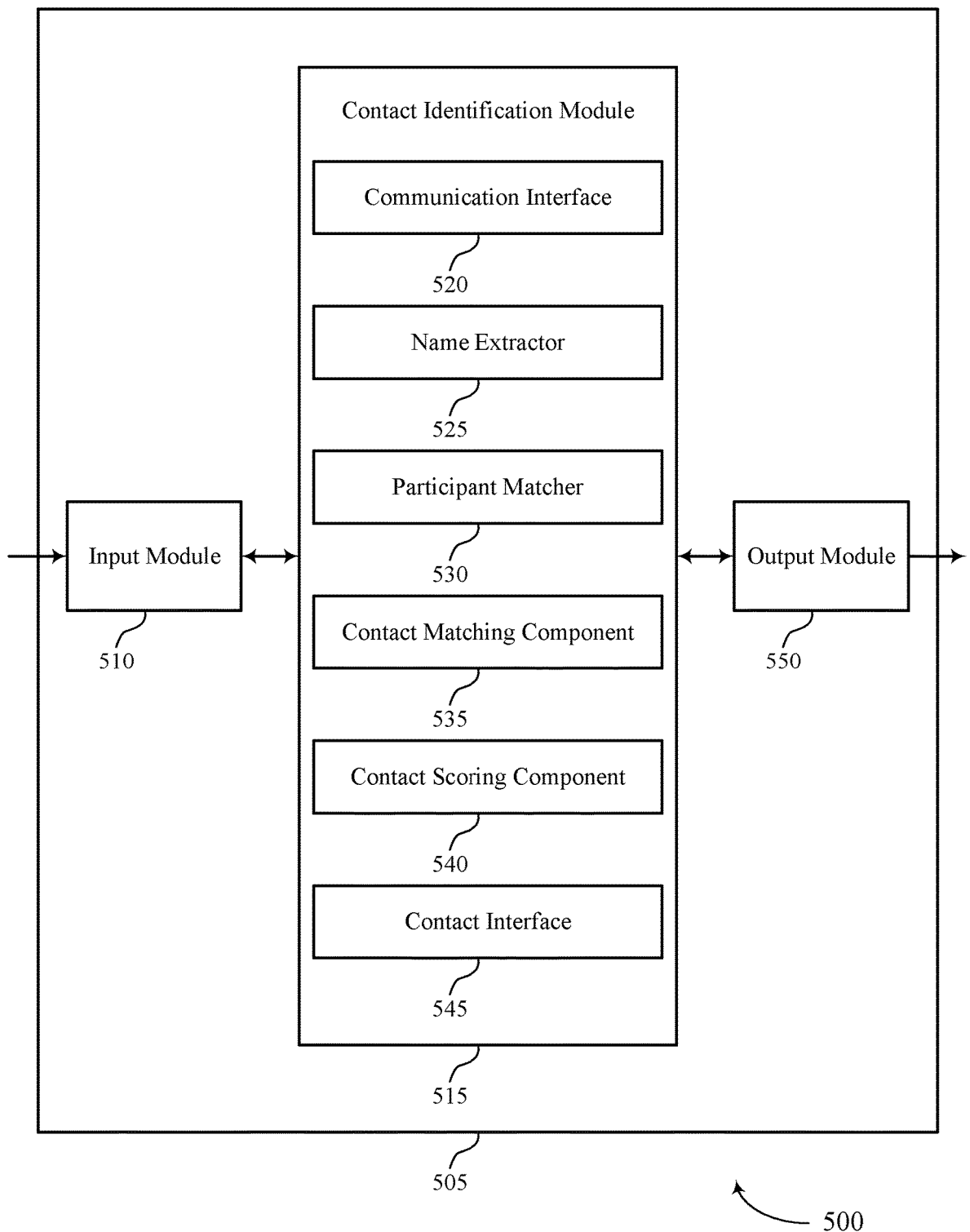
FIG. 5 shows a block diagram of an apparatus that supports contact information extraction and identification in accordance with aspects of the present disclosure.

FIG. 5 shows a block diagram 500 of an apparatus 505 that supports contact information extraction and identification in accordance with aspects of the present disclosure. The apparatus 505 may include an input module 510, a contact identification module 515, and an output module 550. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the contact identification module 515 to support contact information extraction and identification. In some cases, the input module 510 may be a component of an input/output (I/O) controller 715 as described with reference to FIG. 7.

The contact identification module 515 may include a communication interface 520, a name extractor 525, a participant matcher 530, a contact matching component 535, a contact scoring component 540, and a contact interface 545. The contact identification module 515 may be an example of aspects of the contact identification module 605 or 710 described with reference to FIGS. 6 and 7.

The contact identification module 515 and/or at least some of its various sub-components may be implemented in hardware, software executed by a processor, firmware, or any combination thereof. If implemented in software executed by a processor, the functions of the contact identification module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The contact identification module 515 and/or at least some of its various sub-components may be physically located at various positions, including being distributed such that portions of functions are implemented at different physical locations by one or more physical devices. In some examples, the contact identification module 515 and/or at least some of its various sub-components may be a separate and distinct component in accordance with various aspects of the present disclosure. In other examples, the contact identification module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The communication interface 520 may receive, at the data server, a first digital communication message associated with at least a first user identifier and a second user identifier, the first communication message transmitted between user devices associated with the first user identifier and the second user identifier. The name extractor 525 may extract, by the data server, a name of a person from a body of the digital communication message. The participant matcher 530 may determine whether the extracted name corresponds to the first user identifier or the second user identifier.

The contact matching component 535 may identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers.

The contact scoring component 540 may determine whether the extracted name corresponds to at least one name associated with each user identifier of the set of additional user identifiers.

The contact interface 545 may transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers.

The output module 550 may manage output signals for the apparatus 505. For example, the output module 550 may receive signals from other components of the apparatus 505, such as the contact identification module 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
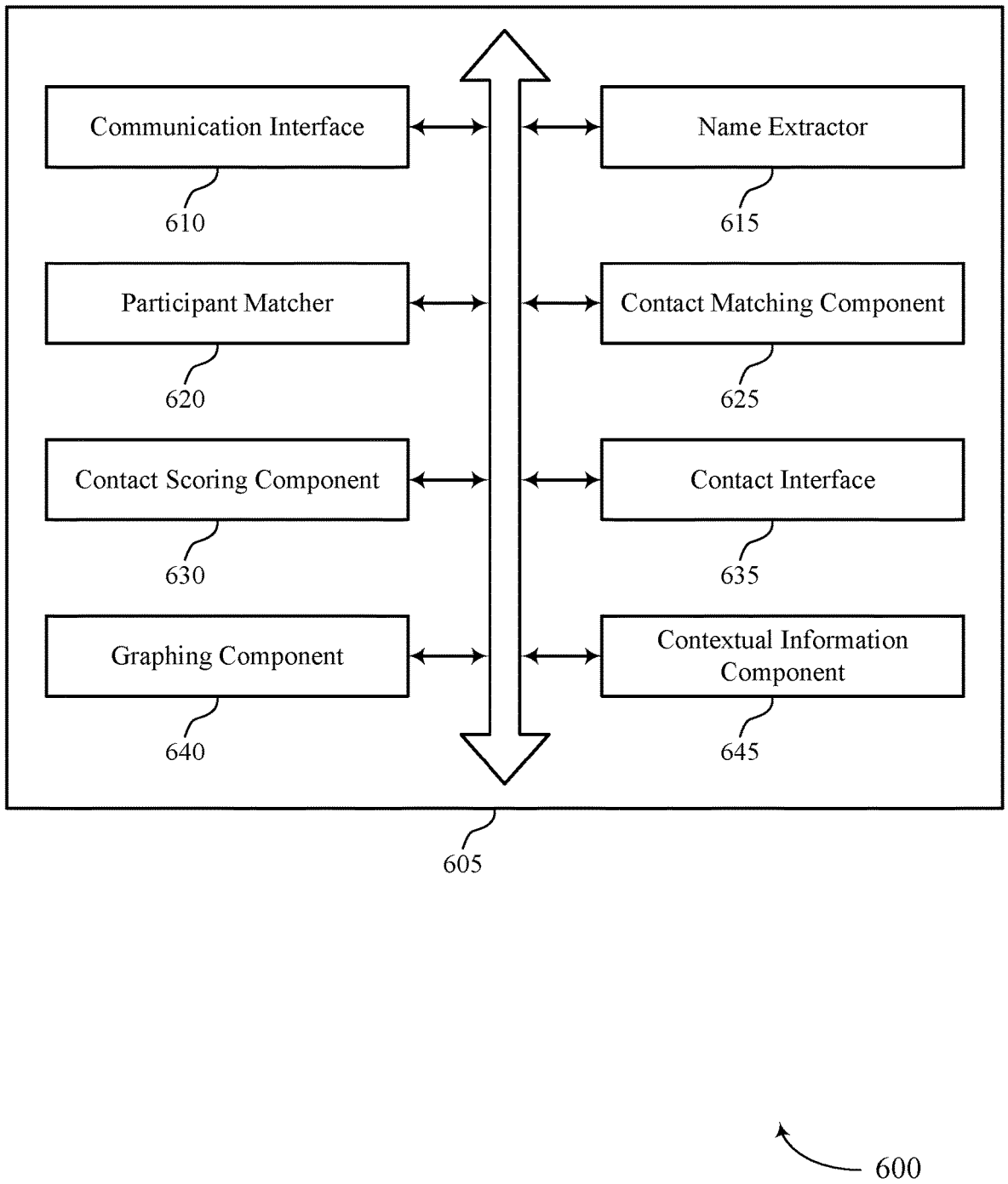
FIG. 6 shows a block diagram of a contact identification module that supports contact information extraction and identification in accordance with aspects of the present disclosure.

FIG. 6 shows a block diagram 600 of a contact identification module 605 that supports contact information extraction and identification in accordance with aspects of the present disclosure. The contact identification module 605 may be an example of aspects of a contact identification module 515 or a contact identification module 710 described herein. The contact identification module 605 may include a communication interface 610, a name extractor 615, a participant matcher 620, a contact matching component 625, a contact scoring component 630, a contact interface 635, a graphing component 640, and a contextual information component 645. Each of these modules may communicate, directly or indirectly, with one another (e.g., via one or more buses).

The communication interface 610 may receive, at the data server, a first digital communication message associated with at least a first user identifier and a second user identifier, the first communication message transmitted between user devices associated with the first user identifier and the second user identifier.

The name extractor 615 may extract, by the data server, a name of a person from a body of the digital communication message. In some examples, the name extractor 615 may extract the name of the person from the body of the communication message using one or more name identification heuristics. The participant matcher 620 may determine whether the extracted name corresponds to the first user identifier or the second user identifier.

The contact matching component 625 may identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers.

In some examples, the contact matching component 625 may identify a set of matching user identifiers based on determining that the extracted name corresponds to the at least one name associated with each user identifier of the set of additional user identifiers. In some examples, the contact matching component 625 may filter the set of matching user identifiers based on information associated with at least one of the set of matching user identifiers, where the indication includes the filtered set of matching user identifiers. In some examples, the contact matching component 625 may determine whether the extracted name corresponds to the at least one name associated with each user identifier of the set of additional user identifiers based on user preferences, the user preferences indicating a preference for a first name match, a last name match, a nickname match, or a combination thereof. In some examples, the contact matching component 625 may match the extracted name with the at least one name. In some cases, the information associated with at least one of the set of matching user identifiers includes an executive title, purchase history, time period since last communication, role information, a degree of connectedness, or a combination thereof.

The contact scoring component 630 may determine whether the extracted name corresponds to at least one name associated with each user identifier of the set of additional user identifiers. In some examples, the contact scoring component 630 may assign correlation metric assigned to each user identifier of the set of additional user identifiers based on a degree of matching. In some examples, the contact scoring component 630 may assign additional weight to the correlation metric associated with each user identifier of the set of additional user identifiers corresponding to a sender of the communication message.

The contact interface 635 may transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers.

The graphing component 640 may identify the set of additional user identifiers based on a weight of connection between one of the first user identifier and the first set of user identifiers and the second user identifier and the second set of user identifiers. In some cases, the first distributed graph representation of one or more connections between the first user identifier and the first set of user identifiers is based on communications between the first set of user identifiers. In some cases, the second distributed graph representation of one or more connections between the second user identifier and the second set of user identifiers is based on communications between the second set of user identifiers, where the first distributed graph representation and the second distributed graph representation are generated from a connection graph of the set of user identifiers based on communications between the set of user identifiers. In some cases, the first set of user identifiers includes a first number of user identifiers that are closely connected to the first user identifier relative to other user identifiers of the connection graph based on the communications. In some cases, the second set of user identifiers includes a second number of user identifiers that are closely connected to the second user identifier relative to the other user identifiers of the connection graph based on the communications.

The contextual information component 645 may identify the set of additional user identifiers based further on contextual information associated with the communication message.

Figure 7:
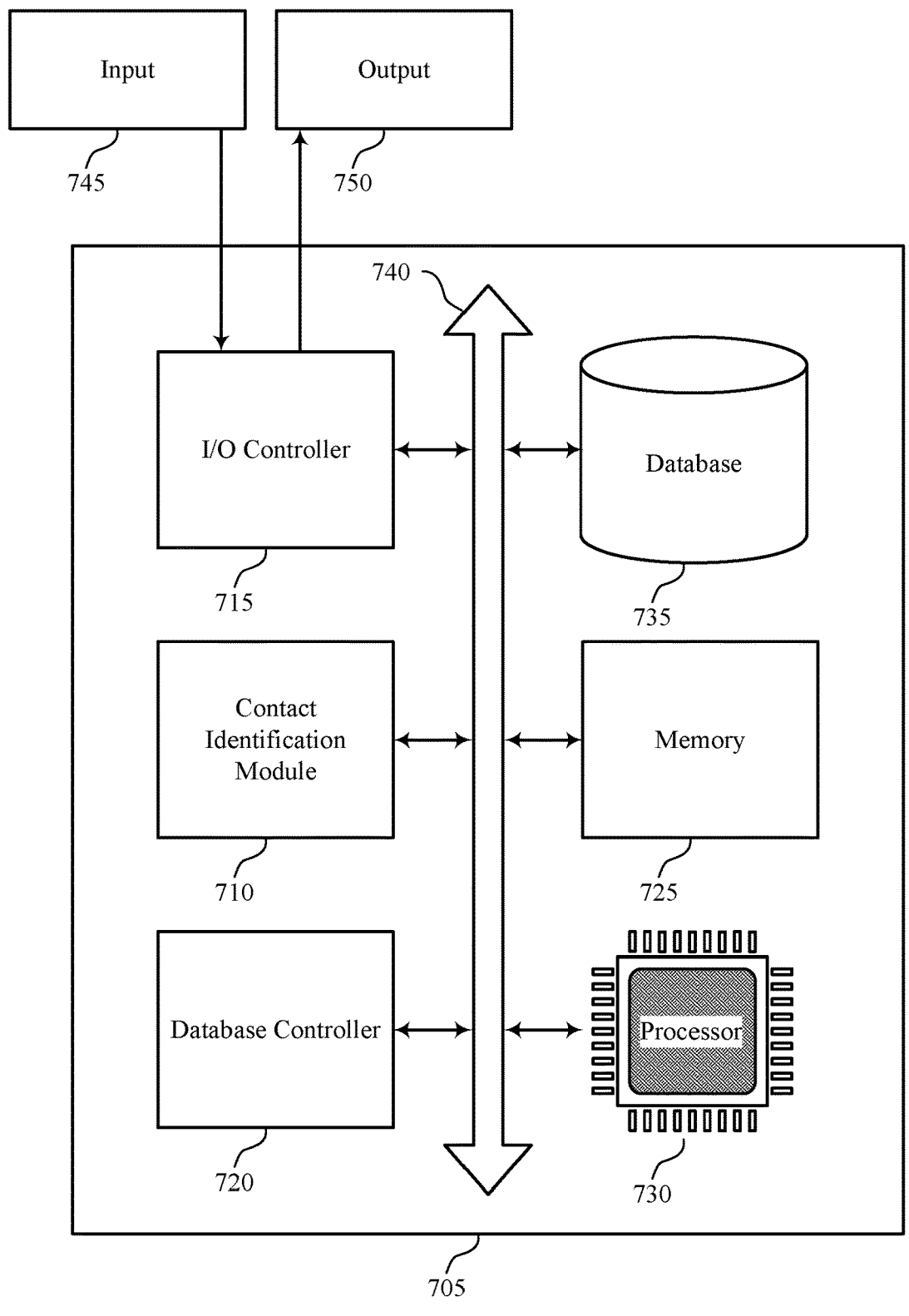
FIG. 7 shows a diagram of a system including a device that supports contact information extraction and identification in accordance with aspects of the present disclosure.

FIG. 7 shows a diagram of a system 700 including a device 705 that supports contact information extraction and identification in accordance with aspects of the present disclosure. The device 705 may be an example of or include the components of a database server or an apparatus 505 as described herein. The device 705 may include components for bi-directional data communications including components for transmitting and receiving communications, including a contact identification module 710, an I/O controller 715, a database controller 720, memory 725, a processor 730, and a database 735. These components may be in electronic communication via one or more buses (e.g., bus 740).

The contact identification module 710 may be an example of a contact identification module 515 or 605 as described herein. For example, the contact identification module 710 may perform any of the methods or processes described herein with reference to FIGS. 5 and 6. In some cases, the contact identification module 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting contact information extraction and identification).

Figure 8:
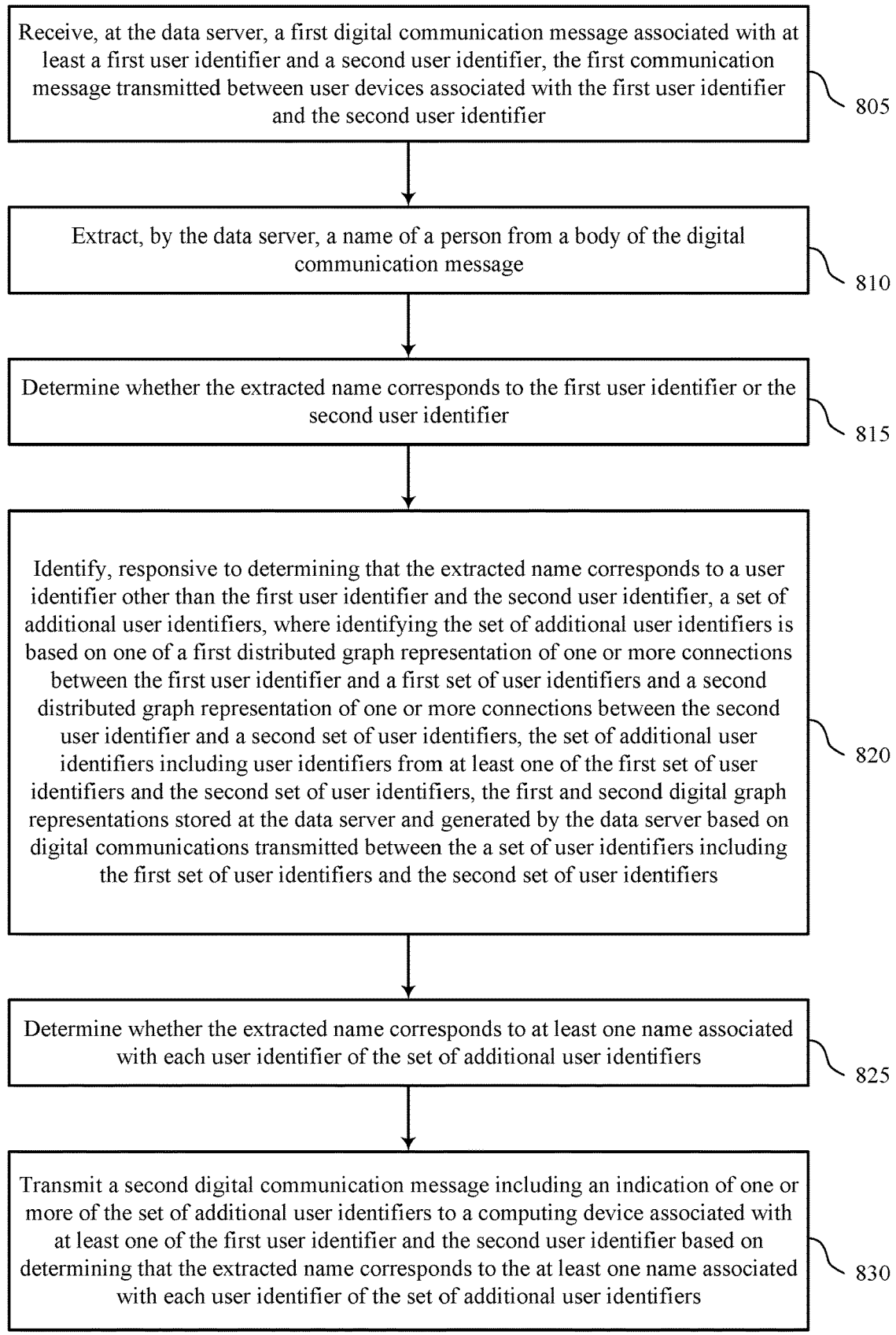
FIGS. 8 through 10 show flowcharts illustrating methods that support contact information extraction and identification in accordance with aspects of the present disclosure.

FIG. 8 shows a flowchart illustrating a method 800 that supports contact information extraction and identification in accordance with aspects of the present disclosure. The operations of method 800 may be implemented by a database server or its components as described herein. For example, the operations of method 800 may be performed by a contact identification module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 805, the database server may receive, at the data server, a first digital communication message associated with at least a first user identifier and a second user identifier, the first communication message transmitted between user devices associated with the first user identifier and the second user identifier. The operations of 805 may be performed according to the methods described herein. In some examples, aspects of the operations of 805 may be performed by a communication interface as described with reference to FIGS. 5 through 7.

At 810, the database server may extract, by the data server, a name of a person from a body of the digital communication message. The operations of 810 may be performed according to the methods described herein. In some examples, aspects of the operations of 810 may be performed by a name extractor as described with reference to FIGS. 5 through 7.

At 815, the database server may determine whether the extracted name corresponds to the first user identifier or the second user identifier. The operations of 815 may be performed according to the methods described herein. In some examples, aspects of the operations of 815 may be performed by a participant matcher as described with reference to FIGS. 5 through 7.

At 820, the database server may identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers. The operations of 820 may be performed according to the methods described herein. In some examples, aspects of the operations of 820 may be performed by a contact matching component as described with reference to FIGS. 5 through 7.

At 825, the database server may determine whether the extracted name corresponds to at least one name associated with each user identifier of the set of additional user identifiers. The operations of 825 may be performed according to the methods described herein. In some examples, aspects of the operations of 825 may be performed by a contact scoring component as described with reference to FIGS. 5 through 7.

At 830, the database server may transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers. The operations of 830 may be performed according to the methods described herein. In some examples, aspects of the operations of 830 may be performed by a contact interface as described with reference to FIGS. 5 through 7.

Figure 9:
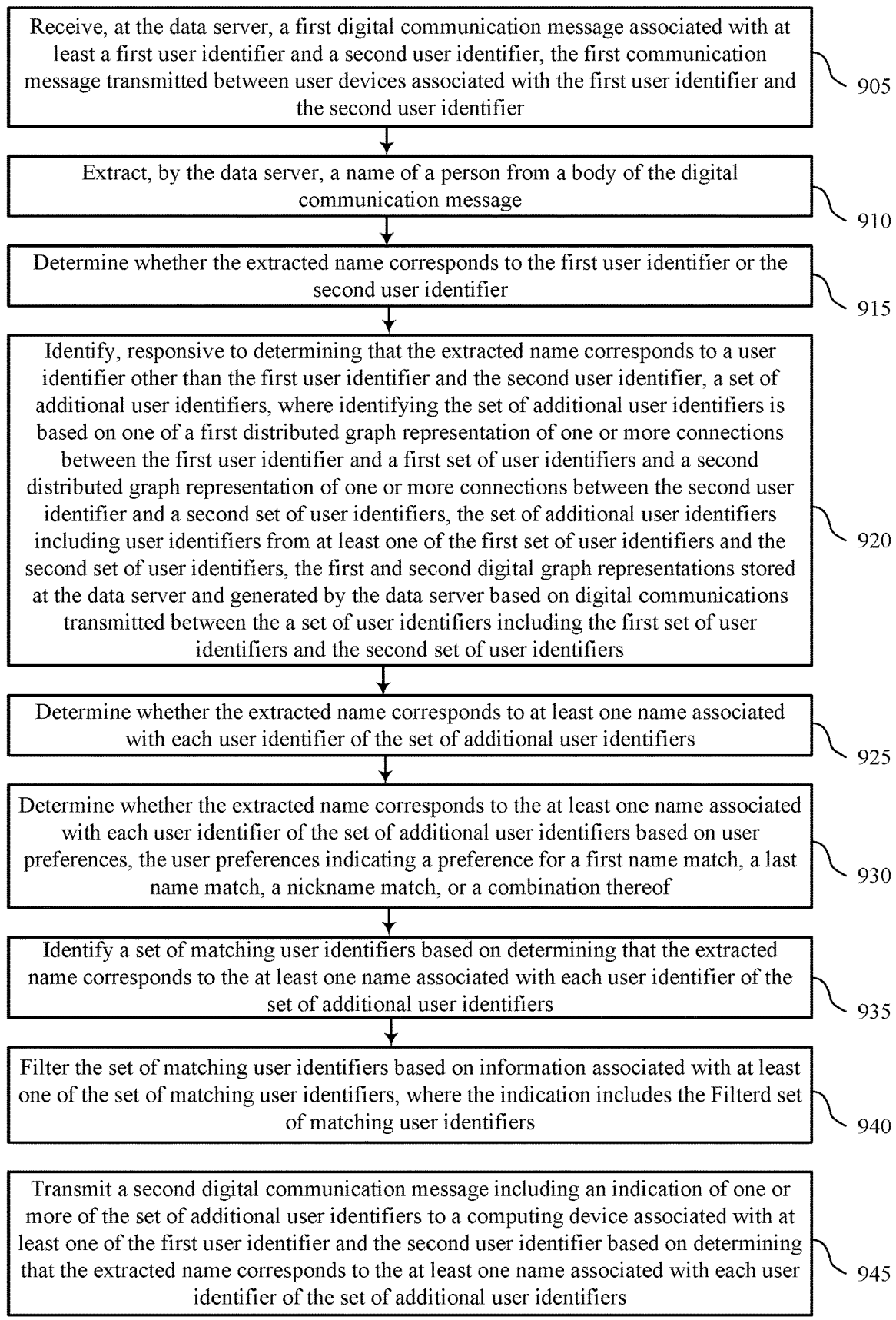

FIG. 9 shows a flowchart illustrating a method 900 that supports contact information extraction and identification in accordance with aspects of the present disclosure. The operations of method 900 may be implemented by a database server or its components as described herein. For example, the operations of method 900 may be performed by a contact identification module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 905, the database server may receive, at the data server, a first digital communication message associated with at least a first user identifier and a second user identifier, the first communication message transmitted between user devices associated with the first user identifier and the second user identifier. The operations of 905 may be performed according to the methods described herein. In some examples, aspects of the operations of 905 may be performed by a communication interface as described with reference to FIGS. 5 through 7.

At 910, the database server may extract, by the data server, a name of a person from a body of the digital communication message. The operations of 910 may be performed according to the methods described herein. In some examples, aspects of the operations of 910 may be performed by a name extractor as described with reference to FIGS. 5 through 7.

At 915, the database server may determine whether the extracted name corresponds to the first user identifier or the second user identifier. The operations of 915 may be performed according to the methods described herein. In some examples, aspects of the operations of 915 may be performed by a participant matcher as described with reference to FIGS. 5 through 7.

At 920, the database server may identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers. The operations of 920 may be performed according to the methods described herein. In some examples, aspects of the operations of 920 may be performed by a contact matching component as described with reference to FIGS. 5 through 7.

At 925, the database server may determine whether the extracted name corresponds to at least one name associated with each user identifier of the set of additional user identifiers. The operations of 925 may be performed according to the methods described herein. In some examples, aspects of the operations of 925 may be performed by a contact scoring component as described with reference to FIGS. 5 through 7.

At 930, the database server may determine whether the extracted name corresponds to the at least one name associated with each user identifier of the set of additional user identifiers based on user preferences, the user preferences indicating a preference for a first name match, a last name match, a nickname match, or a combination thereof. The operations of 930 may be performed according to the methods described herein. In some examples, aspects of the operations of 930 may be performed by a contact matching component as described with reference to FIGS. 5 through 7.

At 935, the database server may identify a set of matching user identifiers based on determining that the extracted name corresponds to the at least one name associated with each user identifier of the set of additional user identifiers. The operations of 935 may be performed according to the methods described herein. In some examples, aspects of the operations of 935 may be performed by a contact matching component as described with reference to FIGS. 5 through 7.

At 940, the database server may filter the set of matching user identifiers based on information associated with at least one of the set of matching user identifiers, where the indication includes the filtered set of matching user identifiers. The operations of 940 may be performed according to the methods described herein. In some examples, aspects of the operations of 940 may be performed by a contact matching component as described with reference to FIGS. 5 through 7.

At 945, the database server may transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers. The operations of 945 may be performed according to the methods described herein. In some examples, aspects of the operations of 945 may be performed by a contact interface as described with reference to FIGS. 5 through 7.

Figure 10:
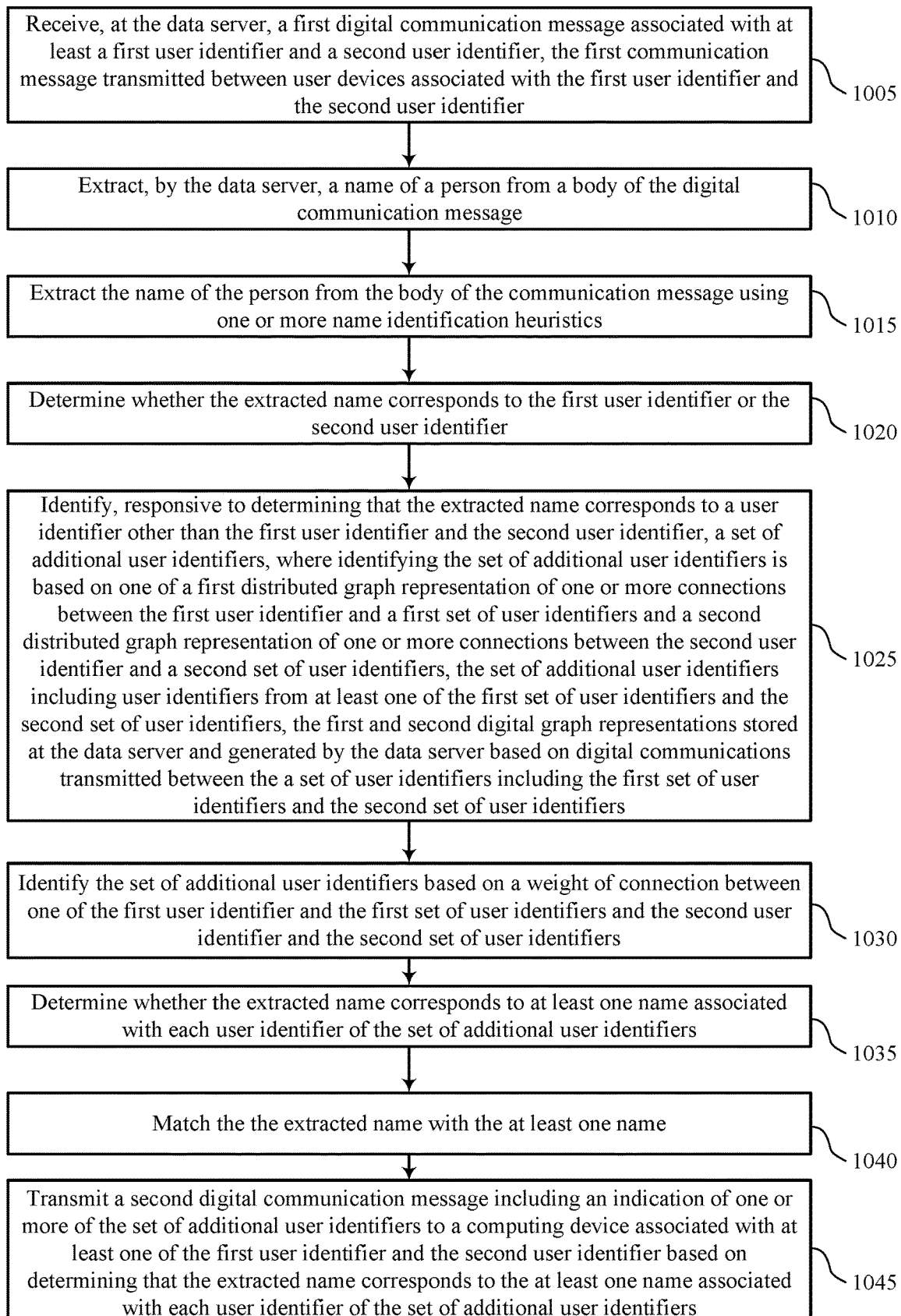

FIG. 10 shows a flowchart illustrating a method 1000 that supports contact information extraction and identification in accordance with aspects of the present disclosure. The operations of method 1000 may be implemented by a database server or its components as described herein. For example, the operations of method 1000 may be performed by a contact identification module as described with reference to FIGS. 5 through 7. In some examples, a database server may execute a set of instructions to control the functional elements of the database server to perform the functions described herein. Additionally or alternatively, a database server may perform aspects of the functions described herein using special-purpose hardware.

At 1005, the database server may receive, at the data server, a first digital communication message associated with at least a first user identifier and a second user identifier, the first communication message transmitted between user devices associated with the first user identifier and the second user identifier. The operations of 1005 may be performed according to the methods described herein. In some examples, aspects of the operations of 1005 may be performed by a communication interface as described with reference to FIGS. 5 through 7.

At 1010, the database server may extract, by the data server, a name of a person from a body of the digital communication message. The operations of 1010 may be performed according to the methods described herein. In some examples, aspects of the operations of 1010 may be performed by a name extractor as described with reference to FIGS. 5 through 7.

At 1015, the database server may extract the name of the person from the body of the communication message using one or more name identification heuristics. The operations of 1015 may be performed according to the methods described herein. In some examples, aspects of the operations of 1015 may be performed by a name extractor as described with reference to FIGS. 5 through 7.

At 1020, the database server may determine whether the extracted name corresponds to the first user identifier or the second user identifier. The operations of 1020 may be performed according to the methods described herein. In some examples, aspects of the operations of 1020 may be performed by a participant matcher as described with reference to FIGS. 5 through 7.

At 1025, the database server may identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers. The operations of 1025 may be performed according to the methods described herein. In some examples, aspects of the operations of 1025 may be performed by a contact matching component as described with reference to FIGS. 5 through 7.

At 1030, the database server may identify the set of additional user identifiers based on a weight of connection between one of the first user identifier and the first set of user identifiers and the second user identifier and the second set of user identifiers. The operations of 1030 may be performed according to the methods described herein. In some examples, aspects of the operations of 1030 may be performed by a graphing component as described with reference to FIGS. 5 through 7.

At 1035, the database server may determine whether the extracted name corresponds to at least one name associated with each user identifier of the set of additional user identifiers. The operations of 1035 may be performed according to the methods described herein. In some examples, aspects of the operations of 1035 may be performed by a contact scoring component as described with reference to FIGS. 5 through 7.

At 1040, the database server may match the extracted name with the at least one name. The operations of 1040 may be performed according to the methods described herein. In some examples, aspects of the operations of 1040 may be performed by a contact matching component as described with reference to FIGS. 5 through 7.

At 1045, the database server may transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers. The operations of 1045 may be performed according to the methods described herein. In some examples, aspects of the operations of 1045 may be performed by a contact interface as described with reference to FIGS. 5 through 7.

A method of data processing at a data server is described. The method may include receiving, at the data server, a first digital communication message associated with at least a first user identifier and a second user identifier, the first communication message transmitted between user devices associated with the first user identifier and the second user identifier, extracting, by the data server, a name of a person from a body of the digital communication message, determining whether the extracted name corresponds to the first user identifier or the second user identifier, identifying, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers, determining whether the extracted name corresponds to at least one name associated with each user identifier of the set of additional user identifiers, and transmitting a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers.

An apparatus for data processing at a data server is described. The apparatus may include a processor, memory in electronic communication with the processor, and instructions stored in the memory. The instructions may be executable by the processor to cause the apparatus to receive, at the data server, a first digital communication message associated with at least a first user identifier and a second user identifier, the first communication message transmitted between user devices associated with the first user identifier and the second user identifier, extract, by the data server, a name of a person from a body of the digital communication message, determine whether the extracted name corresponds to the first user identifier or the second user identifier, identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers, determine whether the extracted name corresponds to at least one name associated with each user identifier of the set of additional user identifiers, and transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers.

Another apparatus for data processing at a data server is described. The apparatus may include means for receiving, at the data server, a first digital communication message associated with at least a first user identifier and a second user identifier, the first communication message transmitted between user devices associated with the first user identifier and the second user identifier, extracting, by the data server, a name of a person from a body of the digital communication message, determining whether the extracted name corresponds to the first user identifier or the second user identifier, identifying, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers, determining whether the extracted name corresponds to at least one name associated with each user identifier of the set of additional user identifiers, and transmitting a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers.

A non-transitory computer-readable medium storing code for data processing at a data server is described. The code may include instructions executable by a processor to receive, at the data server, a first digital communication message associated with at least a first user identifier and a second user identifier, the first communication message transmitted between user devices associated with the first user identifier and the second user identifier, extract, by the data server, a name of a person from a body of the digital communication message, determine whether the extracted name corresponds to the first user identifier or the second user identifier, identify, responsive to determining that the extracted name corresponds to a user identifier other than the first user identifier and the second user identifier, a set of additional user identifiers, where identifying the set of additional user identifiers is based on one of a first distributed graph representation of one or more connections between the first user identifier and a first set of user identifiers and a second distributed graph representation of one or more connections between the second user identifier and a second set of user identifiers, the set of additional user identifiers including user identifiers from at least one of the first set of user identifiers and the second set of user identifiers, the first and second digital graph representations stored at the data server and generated by the data server based on digital communications transmitted between the a set of user identifiers including the first set of user identifiers and the second set of user identifiers, determine whether the extracted name corresponds to at least one name associated with each user identifier of the set of additional user identifiers, and transmit a second digital communication message including an indication of one or more of the set of additional user identifiers to a computing device associated with at least one of the first user identifier and the second user identifier based on determining that the extracted name corresponds to the at least one name associated with each user identifier of the set of additional user identifiers.

Some examples of the method, apparatuses, and non-transitory computer-readable medium described herein may further include operations, features, means, or instructions for identifying a set of matching user identifiers based on determining that the extracted name corresponds to the at least one name associated with each user identifier of the set of additional user identifiers, and filtering the set of matching user identifiers based on information associated with at least one of the set of matching user identifiers, where the indication includes the filtered set of matching user identifiers.

In some examples of the method, apparatuses, and non-transitory computer-readable medium described herein, the information associated with at least one of the set of matching user identifiers includes an executive title, purchase history, time period since last communication, role information, a degree of connectedness, or a combination thereof.

Some examples of the method, apparatuses, and non-transitory computer-readable medium described herein may further include operations, features, means, or instructions for determining whether the extracted name corresponds to the at least one name associated with each user identifier of the set of additional user identifiers based on user preferences, the user preferences indicating a preference for a first name match, a last name match, a nickname match, or a combination thereof.

In some examples of the method, apparatuses, and non-transitory computer-readable medium described herein, determining whether the extracted name corresponds to the at least one name further may include operations, features, means, or instructions for matching the extracted name with the at least one name.

Some examples of the method, apparatuses, and non-transitory computer-readable medium described herein may further include operations, features, means, or instructions for assigning correlation metric assigned to each user identifier of the set of additional user identifiers based on a degree of matching.

Some examples of the method, apparatuses, and non-transitory computer-readable medium described herein may further include operations, features, means, or instructions for assigning additional weight to the correlation metric associated with each user identifier of the set of additional user identifiers corresponding to a sender of the communication message.

In some examples of the method, apparatuses, and non-transitory computer-readable medium described herein, the first distributed graph representation of one or more connections between the first user identifier and the first set of user identifiers may be based on communications between the first set of user identifiers, and the second distributed graph representation of one or more connections between the second user identifier and the second set of user identifiers may be based on communications between the second set of user identifiers, where the first distributed graph representation and the second distributed graph representation may be generated from a connection graph of the set of user identifiers based on communications between the set of user identifiers.

In some examples of the method, apparatuses, and non-transitory computer-readable medium described herein, the first set of user identifiers includes a first number of user identifiers that may be closely connected to the first user identifier relative to other user identifiers of the connection graph based on the communications, and the second set of user identifiers includes a second number of user identifiers that may be closely connected to the second user identifier relative to the other user identifiers of the connection graph based on the communications.

Some examples of the method, apparatuses, and non-transitory computer-readable medium described herein may further include operations, features, means, or instructions for extracting the name of the person from the body of the communication message using one or more name identification heuristics.

Some examples of the method, apparatuses, and non-transitory computer-readable medium described herein may further include operations, features, means, or instructions for identifying the set of additional user identifiers based on a weight of connection between one of the first user identifier and the first set of user identifiers and the second user identifier and the second set of user identifiers.

Some examples of the method, apparatuses, and non-transitory computer-readable medium described herein may further include operations, features, means, or instructions for identifying the set of additional user identifiers based further on contextual information associated with the communication message.

In some examples of the method, apparatuses, and non-transitory computer-readable medium described herein, the first digital communication message may be an email.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a data server, comprising: receiving, at the data server, a first digital communication message associated with at least a first user identifier of a first user and a second user identifier of a second user, the first digital communication message transmitted between user devices associated with the first user identifier and the second user identifier; extracting, by the data server, a name of a person from a body of the first digital communication message;

determining whether the extracted name is one of a plurality of participants to the first digital communication message based at least in part on comparing the extracted name to information associated with the first user identifier or the second user identifier; identifying, responsive to determining that the extracted name is not one of the plurality of participants to the first digital communication message, a set of additional user identifiers from a first distributed graph representation of one or more connections between the first user identifier and a first set of user identifiers and a second distributed graph representation of one or more connections between the second user identifier and a second set of user identifiers, the first and second distributed graph representations stored at the data server and generated by the data server based on digital communications transmitted between a plurality of user identifiers including the first set of user identifiers and the second set of user identifiers;

determining whether the extracted name corresponds to at least one name associated with a user identifier of the set of additional user identifiers; and transmitting a second digital communication message including an indication of one or more of the set of additional user identifiers to one of the user devices associated with at least one of the first user identifier and the second user identifier based at least in part on determining that the extracted name corresponds to the at least one name associated with the user identifier of the set of additional user identifiers.

2. The method of claim 1, further comprising: identifying a set of matching user identifiers based on determining that the extracted name corresponds to the at least one name associated with each user identifier of the set of additional user identifiers; and filtering the set of matching user identifiers based on information associated with at least one of the set of matching user identifiers, wherein the indication includes the filtered set of matching user identifiers.

3. The method of claim 2, wherein the information associated with at least one of the set of matching user identifiers comprises an executive title, purchase history, time period since last communication, role information, a weight associated with an edge corresponding to the matching set of user identifiers in the first and second distributed graph representations, or a combination thereof.

4. The method of claim 1, further comprising: determining whether the extracted name corresponds to the at least one name associated with each user identifier of the set of additional user identifiers based on user preferences, the user preferences indicating a preference for a first name match, a last name match, a nickname match, or a combination thereof.

5. The method of claim 1, wherein determining whether the extracted name is one of the participants to the first digital communication message further comprises: matching the extracted name with the at least one name.

6. The method of claim 5, further comprising: assigning correlation metric assigned to each user identifier of the set of additional user identifiers based on the matching.

7. The method of claim 6, further comprising: assigning additional weight to the correlation metric associated with each user identifier of the set of additional user identifiers corresponding to a sender of the first digital communication message.

8. The method of claim 1, wherein: the first distributed graph representation of one or more connections between the first user identifier and the first set of user identifiers is based on communications between the first set of user identifiers; and the second distributed graph representation of one or more connections between the second user identifier and the second set of user identifiers is based on communications between the second set of user identifiers, wherein the first distributed graph representation and the second distributed graph representation are generated from a connection graph of the plurality of user identifiers based on communications between the plurality of user identifiers.

9. The method of claim 8, wherein: the first set of user identifiers includes a first number of user identifiers that are closely connected to the first user identifier relative to other user identifiers of the connection graph based on the communications; and the second set of user identifiers includes a second number of user identifiers that are closely connected to the second user identifier relative to the other user identifiers of the connection graph based on the communications.

10. The method of claim 1, further comprising: extracting the name of the person from the body of the first digital communication message using one or more name identification heuristics.

11. The method of claim 1, wherein: identifying the set of additional user identifiers based at least in part on a weight of connection between one of the first user identifier and the first set of user identifiers and the second user identifier and the second set of user identifiers, wherein the weight of connection between various user identifiers is determined based at least in part on interaction frequency, interaction recency, interaction type, or a combination thereof, with other user identifiers.

12. The method of claim 1, further comprising: identifying the set of additional user identifiers based further on contextual information associated with the first digital communication message.

13. The method of claim 1, wherein the first digital communication message is an email.

14. An apparatus for data processing at a data server, comprising:

a processor, memory in electronic communication with the processor; and instructions stored in the memory and executable by the processor to cause the apparatus to:

receive, at the data server, a first digital communication message associated with at least a first user identifier of a first user and a second user identifier of a second user, the first digital communication message transmitted between user devices associated with the first user identifier and the second user identifier;

extract, by the data server, a name of a person from a body of the first digital communication message;

determine whether the extracted name is one of a plurality of participants to the first digital communication message based at least in part on comparing the extracted name to information associated with the first user identifier or the second user identifier;

identify, responsive to determining that the extracted name is not one of the plurality of participants to the first digital communication message, a set of additional user identifiers from a first distributed graph representation of one or more connections between the first user identifier and a first set of user identifiers and a second distributed graph representation of one or more connections between the second user identifier and a second set of user identifiers, the first and second distributed graph representations stored at the data server and generated by the data server based on digital communications transmitted between a plurality of user identifiers including the first set of user identifiers and the second set of user identifiers;

determine whether the extracted name corresponds to at least one name associated with a user identifier of the set of additional user identifiers; and transmit a second digital communication message including an indication of one or more of the set of additional user identifiers to one of the user devices associated with at least one of the first user identifier and the second user identifier based at least in part on determining that the extracted name corresponds to the at least one name associated with the user identifier of the set of additional user identifiers.

15. The apparatus of claim 14, wherein the instructions are further executable by the processor to cause the apparatus to: identify a set of matching user identifiers based on determining that the extracted name corresponds to the at least one name associated with each user identifier of the set of additional user identifiers; and filter the set of matching user identifiers based on information associated with at least one of the set of matching user identifiers, wherein the indication includes the filtered set of matching user identifiers.

16. The apparatus of claim 14, wherein the instructions are further executable by the processor to cause the apparatus to: determine whether the extracted name corresponds to the at least one name associated with each user identifier of the set of additional user identifiers based on user preferences, the user preferences indicating a preference for a first name match, a last name match, a nickname match, or a combination thereof.

17. The apparatus of claim 14, wherein the instructions to determine whether the extracted name is one of the participants to the first digital communication message further are executable by the processor to cause the apparatus to: match the extracted name with the at least one name.

18. The apparatus of claim 17, wherein the instructions are further executable by the processor to cause the apparatus to: assign correlation metric assigned to each user identifier of the set of additional user identifiers based on a degree of matching.

19. A non-transitory computer-readable medium storing code for data processing at a data server, the code comprising instructions executable by a processor to: receive, at the data server, a first digital communication message associated with at least a first user identifier of a first user and a second user identifier of a second user, the first digital communication message transmitted between user devices associated with the first user identifier and the second user identifier; extract, by the data server, a name of a person from a body of the first digital communication message; determine whether the extracted name is one of a plurality of participants to the first digital communication message based at least in part on comparing the extracted name to information associated with the first user identifier or the second user identifier; identify, responsive to determining that the extracted name is not one of the plurality of participants to the first digital communication message, a set of additional user identifiers from a first distributed graph representation of one or more connections between the first user identifier and a first set of user identifiers and a second distributed graph representation of one or more connections between the second user identifier and a second set of user identifiers, the first and second distributed graph representations stored at the data server and generated by the data server based on digital communications transmitted between a plurality of user identifiers including the first set of user identifiers and the second set of user identifiers; determine whether the extracted name corresponds to at least one name associated with a user identifier of the set of additional user identifiers; and transmit a second digital communication message including an indication of one or more of the set of additional user identifiers to one of the user devices associated with at least one of the first user identifier and the second user identifier based at least in part on determining that the extracted name corresponds to the at least one name associated with the user identifier of the set of additional user identifiers.

20. The non-transitory computer-readable medium of claim 19, wherein the instructions are further executable to: identify a set of matching user identifiers based on determining that the extracted name corresponds to the at least one name associated with each user identifier of the set of additional user identifiers; and filter the set of matching user identifiers based on information associated with at least one of the set of matching user identifiers, wherein the indication includes the filtered set of matching user identifiers.

* * * * *